(No Model.)
J. GRAHAM.
WATER FAUCET.
No. 272,040. Patented Feb. 13, 1883.
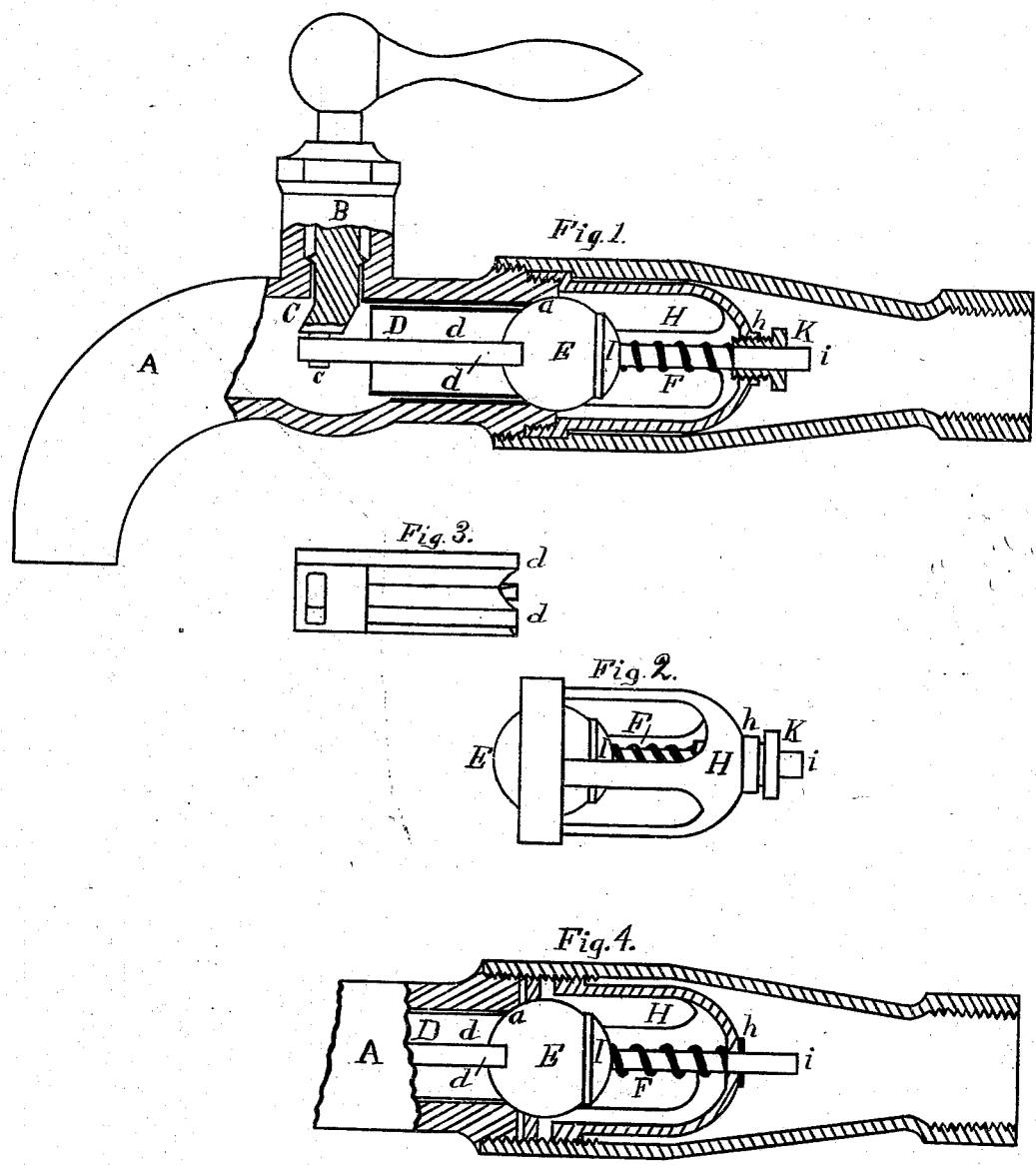

UNITED STATES PATENT OFFICE.

JOHN GRAHAM, OF CHICAGO, ILLINOIS.

WATER-FAUCET.

SPECIFICATION forming part of Letters Patent No. 272,040, dated February 13, 1883.

Application filed October 23, 1882. (No model.)

*To all whom it may concern:*

Be it known that I, JOHN GRAHAM, a citizen of the United States, residing at Chicago, in Cook county, in the State of Illinois, have invented a new and useful Improvement in Water-Faucets, of which the following specification contains a full description.

My invention relates to that class of water-faucets in which the valve consists of a ball held to its seat by the water-pressure and arranged to be forced therefrom by a plunger actuated by suitable exterior connections when water is to be drawn, and to drop therefrom automatically, admitting the air, so as to permit the water to evacuate the pipe when the supply is cut off and the exhaust-vent opened below. As examples of this class, I refer to patent granted to me, No. 197,117, dated November 13, 1877, and also one granted to John H. Johnson, No. 260,030, dated June 27, 1882.

The purpose of my invention is to overcome certain practical difficulties experienced in the use of the above and all other devices of this class hitherto introduced—viz., first, that when the water has been exhausted from the pipes, as is commonly done to prevent freezing in severe weather, a small amount will remain in the horizontal portion of the tail-pipe or in the valve-cavities, and the ball-valve, relieved of the water-pressure, falls into and is frozen fast in this water, or even if no such cavity exists a small amount of water on the sides of the pipe and ice crystals formed before the water was cut off will be sufficient to freeze the ball fast to the sides of the pipe or valve-cavity and away from its seat, so that when the water is again turned on the faucet is found wide open, and must so remain until the flowing water has thawed the valve free from the pipe; second, when, for purpose of any repairs or to cleanse or remove obstructions from the pipe or faucet, it becomes necessary to remove the tail-pipe, (as see form shown in Johnson's patent, above cited,) the ball is entirely freed from its containings, and is liable—and, indeed, in many positions in which such faucets are attached is certain in spite of the utmost care—to fall out and roll away, causing delay and inconvenience and often necessity of replacing. I cure these difficulties and secure certain other structural advantages by the devices as follows:

The plunger is provided with longitudinal guiding-ribs, which form between them exterior water-channels thereon, and it is reciprocated by means of a cam-connection with the stem and at the other end impinges against the ball-valve—on the side toward the discharge—and for that purpose is adapted to pass through the valve-opening and push the ball from its seat. The ball is lightly seated, after the evacuation of the pipes, by cutting off the supply and opening the vent below, by means of a cap in the rear, forced and forcing the ball forward by the pressure of a spiral spring.

The ball, cap, and spring are contained in a cage or skeleton hood, which offers no hinderance to the passage of the water to and around it, from which the ball cannot escape, except onto its seat, and which is smaller than and substantially concentric with the tail-pipe into which it is inserted or protrudes, thereby holding the ball away from the sides of the pipe, thus preventing any possibility of its freezing to the sides of the pipe, or anywhere but upon its seat, from which, if it should freeze there, it could be forced by the plunger, so preventing any inconvenience.

Figure 1 is a partly sectional and partly perspective view of a faucet containing my devices. Fig. 2 is a perspective of the cage containing the ball, cap, and spring. Fig. 3 is a perspective of the plunger. Fig. 4 shows sectionally a different form of structure embodying the same devices.

Reference being had to the drawings, A is the body of the faucet.

B is the stuffed box, through which the actuating-stem C extends, terminating within in the crank-wrist *c*, operating as a cam in the slot *b* in the head of the plunger D.

The plunger D is provided with longitudinal ribs *d d*, which bear against the inner walls of the faucet-chamber, and form between them, on the surface of the plunger, a series of channels or water-ways from the valve-opening to the nozzle.

E is the ball-valve, retained in the cage H, so as to have a limited motion in front of its seat *a*, but always to be free from the sides of the pipe.

I is a cup-shaped cap, bearing by its concave side against the ball-valve and provided with a stem, *i*, which passes out through the sleeve K and is forced forward against the ball E by the spring F. The sleeve K is screw-threaded into the hub h of the cage H, and terminates at the outer end in a burr or nut, k, and at the inner end bears against the end of the spiral spring F, by which arrangement the pressure of the spring upon the cap, and thence the pressure of the valve-ball E upon its seat a, may be regulated and modified at will, according to the weight of the valve and position—horizontal or vertical—of the pipe, and may be adjusted, as the spring may lose tension by lapse of time, the pressure being always made great enough to sustain the weight of the ball and hold it upon its seat when the pipe is empty, and slight enough so that, notwithstanding it, the air may enter around the valve and cause the evacuation of the pipes when the supply is cut off below.

The cage H may be joined to the faucet A, as in Fig. 1, in which case, when the faucet is detached from the pipe for any repairs, it will bring the cage and its contained ball, spring, and cap with it, all being in compact form, the ball and other small parts being securely contained within the cage and not liable to loss. I do not, however, confine myself to this form of structure. On the contrary, it may sometimes be desirable to have the cage adjustably attached to the tail-pipe M, as in Fig. 4, and in this case the adjustment, which in the form shown in Fig. 1 is accomplished by means of the sleeve K, is effected by screwing the cage forward or backward in the tail-pipe M. In this form, for the purpose of preventing loss of the ball-valve during repairs, I provide the ring P, having the opening less than the diameter of the ball, and which, being screwed into the end of the tail-pipe M, as shown, serves to retain the ball in the cage.

I am aware that a cage has heretofore been employed to limit the motion of a ball-valve where such valve has been used in pumps or elsewhere substantially as a check-valve. I am also aware that a spring to force and hold a valve upon its seat is not novel. I do not therefore claim either of these features broadly; but

I claim—

1. In a water-faucet, in combination with a detached ball-valve adapted to be seated by the water-pressure, a cage through which the water can pass freely, interposed between the ball and the water-source, and holding the ball away from contact with the walls of the pipe or faucet-chamber, substantially as and for the purpose set forth.

2. In a water-faucet in which a detached ball-valve is seated by the water-pressure, the combination, with such valve, of a plunger having suitable bearings and caused by spring pressure to impinge upon the ball-valve, so as to seat it lightly when the water-pressure is withdrawn, substantially as set forth.

3. In a faucet having a ball-valve seated by the water-pressure, a plunger for unseating the valve, having longitudinal guiding-ribs which serve as bearings for the plunger against the inner surface of the cock, and which form the walls of channels for the passage of the water to the nozzle.

4. In the described water-cock, the combination of the ball-valve E and cage H, with the cap I, having the spindle i and the spring F, substantially as and for the purpose set forth.

5. In the described water-cock, the combination, with the cage H, having within it the cap I forced by the spring F, of the sleeve K, terminating in the nut or burr k, for the purpose of regulating the pressure of the spring, substantially as set forth.

6. In combination with the ball-valve E, the plunger D, having the ribs d, and having the end which impinges against the ball-valve concaved or hollowed, for the purpose of centering the ball in the pipe when it is pushed off its seat, substantially as set forth.

In testimony that I claim the above as my invention I have hereunto set my hand, in the presence of two witnesses, at Chicago, Illinois, this 9th day of October, 1882.

JOHN GRAHAM.

Attest:
M. W. JOHNSON,
CHAS. S. BURTON.